June 29, 1954 S. C. CHESICK Re. 23,841

ACCESSORY FOR USE WITH TELEPHONES

Original Filed July 3, 1948 2 Sheets-Sheet 1

ACCESSORY FOR USE WITH TELEPHONES
Original Filed July 3, 1948 2 Sheets-Sheet 2
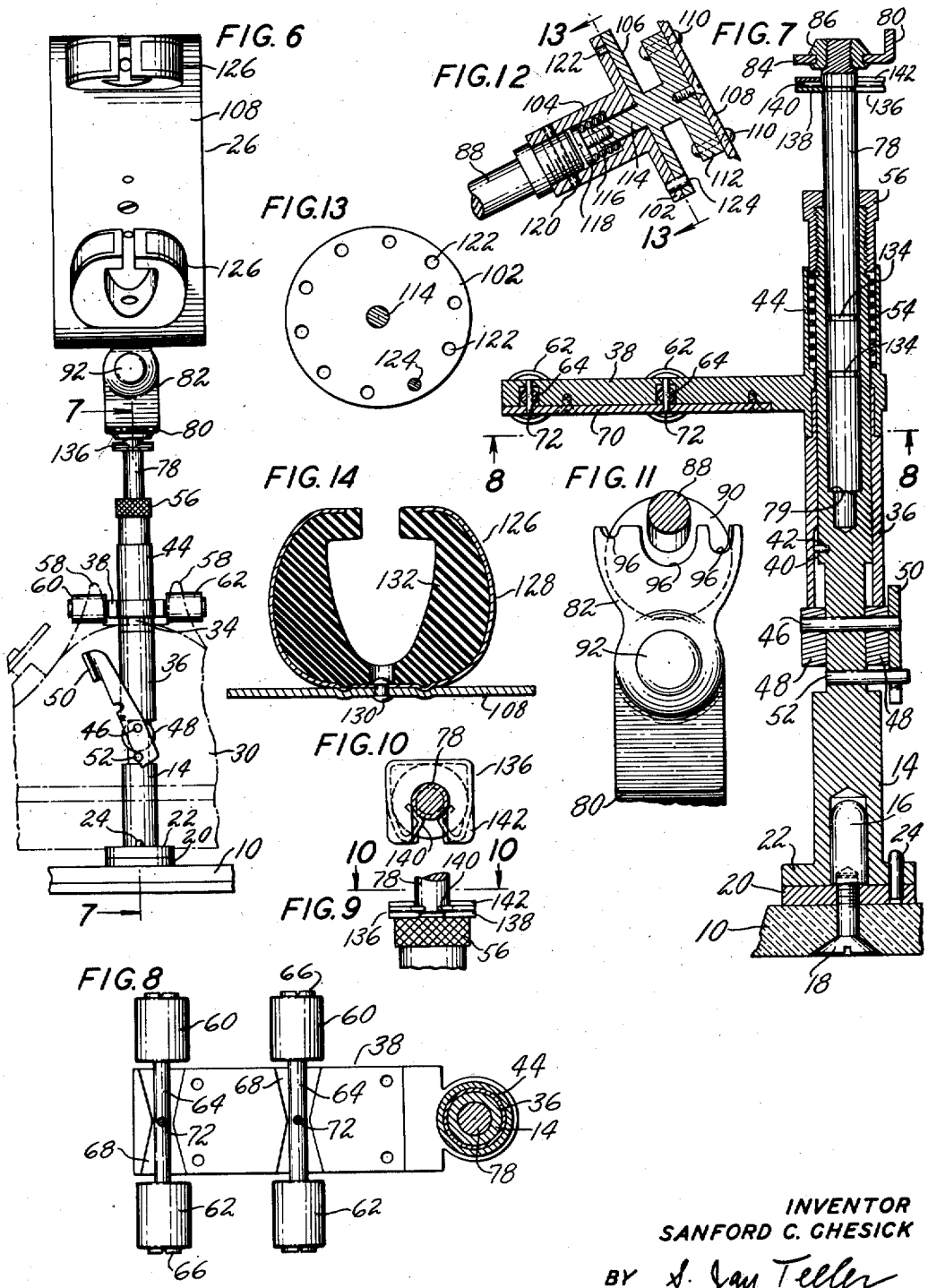
INVENTOR
SANFORD C. CHESICK
BY S. Jay Teller
ATTORNEY Reissued June 29, 1954

Re. 23,841

UNITED STATES PATENT OFFICE 23,841

ACCESSORY FOR USE WITH TELEPHONES

Sanford C. Chesick, Hartford, Conn.

Original No. 2,595,054, dated April 29, 1952, Serial No. 36,941, July 3, 1948. Application for reissue April 28, 1953, Serial No. 356,327

15 Claims. (Cl. 179—150)

Matter enclosed in heavy brackets [ ] appears in the original patent but forms no part of this reissue specification; matter printed in italics indicates the additions made by reissue.

The invention relates to an accessory for use with a telephone, and more particularly to such an accessory adapted for holding the combined transmitter and receiver in a convenient position for use, thus leaving both hands of the user free for other purposes.

One of the objects of the invention is to provide an accessory of the class described, having advantageous means for detachably connecting the main portion of the attachment with a supporting platform.

Another object of the invention is to provide an accessory as described having novel and advantageous manually operable means for moving the switch button on the telephone base to close or open the telephone circuit.

Still another object of the invention is to provide an accessory of the described class having novel and advantageous means for supporting the combined transmitter and receiver in any one of a variety of positions.

Additional objects of the invention will be apparent from the drawings and from the following specification and claims.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 6 is a side view of the accessory.

Fig. 7 is an enlarged fragmentary vertical sectional view taken along the line 7—7 of Fig. 6.

Fig. 8 is a view taken along the line 8—8 of Fig. 6, the bottom plate of the horizontally extending arm being omitted.

Fig. 9 is a fragmentary front view showing the stop for retaining the supporting rod in an elevated position, as illustrated in Fig. 2.

Fig. 10 is a view taken along the line 10—10 of Fig. 9.

Fig. 11 is a fragmentary side view of the clamp for holding the inclined laterally extending arm, this view being taken along the line 11—11 of Fig. 1.

Fig. 12 is an enlarged fragmentary sectional view taken along the line 12—12 of Fig. 1.

Fig. 13 is a sectional view taken along the line 13—13 of Fig. 12.

Fig. 14 is an enlarged fragmentary sectional view taken along the line 14—14 of Fig. 1.

Figures 1, 2, 3, 4, 5:
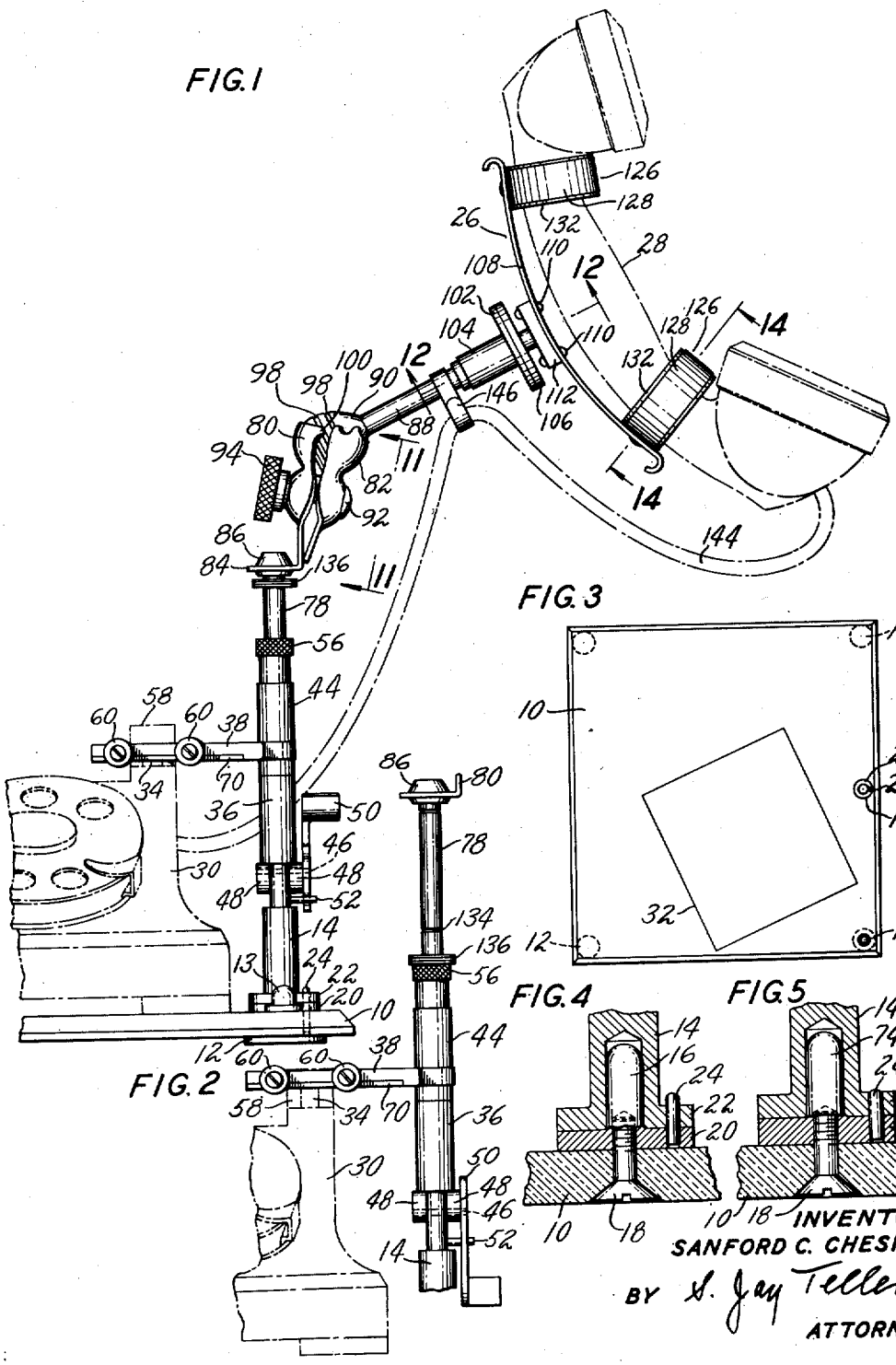
Fig. 1 is a front view of an accessory embodying the invention.
Fig. 2 is a fragmentary front view showing some of the parts in different positions.
Fig. 3 is a plan view, on a reduced scale, of the supporting platform with the other parts of the accessory omitted.
Fig. 4 is a fragmentary vertical sectional view through the supporting platform and the lower portion of the main post.
Fig. 5 is a view similar to Fig. 4 but showing the main post at a higher elevation.

Referring to the drawings, 10 represents a supporting plate or platform which carries the other parts of the accessory and which also supports the base of the telephone with which the accessory is to be used. The platform is shown as being rectangular in shape but the shape of the platform may be widely varied. The platform may be formed of any suitable material such as laminated wood or molded plastic. The platform may be provided with felt pads 12, 12 in order to avoid scratching or marring the desk on which the platform may be placed. A stud 13 may be provided at the front right corner of the platform which may be manually engaged for moving the entire platform.

Carried by the platform is a vertical post 14 which serves to support various other parts as hereinafter explained in detail. The post 14 is preferably detachably connected with the platform 10 and as shown in Fig. 4 the platform is provided with a vertical stud 16 which is held in place by a screw 18. The stud 16 enters and fits a central vertical opening in the bottom portion of the post. It will be seen that the post can be readily engaged with or disengaged from the stud. Preferably the stud 16 is provided with a flange 20 and the post 14 is provided with a mating flange 22. A pin 24 projects upward from the flange 20 and through an aperture in the flange 22. The pin 24 serves to locate the post in a predetermined position with respect to the stud 16 and with respect to the platform 10.

Supported on the post 14 by various parts to be described in detail is a holder 26 for the combined transmitter and receiver 28 of the telephone. The base 30 of the telephone is supported on the platform 10 adjacent the post 14. For convenience of illustration the telephone base 30 is shown in Figs. 1, 2 and 6 as positioned with its edges parallel with the edges of the platform, but in use it is ordinarily more convenient for the base to be diagonally positioned. Preferably the platform 10 has lines 32 described thereon for indicating the most convenient location of the base with respect to the platform and for indicating the proper spacing of the base from the post 14. Normally the transmitter and receiver 28 is supported by the holder 26 so long as the accessory is in place and it is not returned to engagement with the base 30.

The base 30 has the usual vertically movable button 34 which is held in its lower open-circuit position by the combined transmitter and receiver when the latter is in its originally intended position on the base, the said button being biased to its upper closed-circuit position. However, when the present accessory is in place the transmitter and receiver is supported on the holder 26 and other means must be provided for causing the movement of the button 34 to its lower open-circuit position or to its upper closed-circuit position. Mechanism for this purpose is carried by the post 14 and this mechanism will now be described.

Vertically movable on the post 14 is a slide 36 which is preferably in the form of a sleeve surrounding and fitting the post. Carried by the [side] *slide* or sleeve 36 is a horizontally extending arm 38 which extends over the button 34 as shown in Figs. 1, 2 and 6. Preferably the sleeve 36 is guided for vertical movement on the post 14, relative rotative movement being prevented. As shown, the sleeve 36 is provided with a vertical interior spline 40 and the post carries a pin 42 which enters the said spline. Thus the sleeve 36 is free for vertical movement, but relative rotative movement is prevented.

Preferably the arm 38 is rotatively connected with the sleeve 36, this being desirable in order that the telephone base may be placed in different positions on the platform 10. As shown, the main portion of the arm 38 is formed integrally with a centrally apertured hub 44. A portion of the aperture in the hub fits the post 14 and another portion fits a reduced portion of the sleeve 36.

For vertically moving the sleeve 36 and the arm 38 there is provided at least one manually movable eccentric and preferably there are two such eccentrics. As shown, the post 14 is flattened at opposite sides and a rotatable shaft 46 extends through a horizontal bearing aperture in the post. Secured to the shaft 46 are two similar eccentrics 48, 48 which engage the opposite flat faces of the post. Connected with the shaft 46 and the eccentrics 48, 48 is a manually operable lever 50 for turning the said shaft and eccentrics. When the lever 50 is in the upper position, as shown in Figs. 1, 6 and 7, the eccentrics are in the positions to permit the sleeve 36 and the arm 38 to move to their lowermost positions. When the lever 50 is moved to its lowermost position, as shown in Fig. 2, the eccentrics are moved to the positions shown in Fig. 2 and the sleeve 36 and the arm 38 are moved to their uppermost positions. Inasmuch as there are two eccentrics, pressure is applied to the sleeve 36 at both sides of the post. A pin 52 on the post 14 limits the movement of the lever 50, so that the sleeve 36 and the arm 38 are either in their lowermost positions or in their uppermost positions. Preferably the lever 50 has notches as shown to receive the pin 52.

A spring is preferably provided for biasing the sleeve 36 and the arm 38 in the downward direction and as shown there is a coil spring 54 which surrounds the upper portion of the post 14 and which is within an upward extension of the hub 44 on the arm 38. The upper end of the spring 54 abuts against a nut 56 having threaded engagement with the upper end of the post 14.

As has been stated, the arm 38 engages the button 34 on the base of the telephone. When the lever 50 is moved to the position shown in Figs. 1, 6 and 7, the arm 38 is moved downward by gravity and by the spring 54 so as to depress the button 34 to its lower open-circuit position. When the lever 50 is moved to the position shown in Fig. 2, the sleeve 36 and the arm 38 are moved upward thus permitting the button 34 to assume its upper closed-circuit position. Thus the user of the accessory can close or open the telephone circuit at will by merely moving the lever 50.

The base of the telephone has the usual upward projections 58, 58 at opposite sides of the button 34 and preferably the arm 38 is provided with *a pair of aligned rollers positioned respectively for engagement with the said projections 58, 58 at the sides thereof adjacent the post 14. As shown, there are* two pairs of rollers which are so positioned that the rollers of the said pairs are at opposite sides of the said projections 58, 58. The rollers of one pair are indicated at 60, 60 and the rollers of the other pair are indicated at 62, 62, the rollers 60, 60 being at opposite sides of the front projection 58 and the rollers 62, 62 being at opposite sides of the rear projection 58. The rollers are preferably formed at least in part of rubber or equivalent material.

Preferably each two rollers 60 and 62 are rotatably mounted on a pin 64 as shown in Figs. 7 and 8, the rollers being held in place by means of screws 66, 66. The main body of the arm 38 is provided with transverse recesses 68, 68. The arm 38 includes a separate bottom plate 70 which is held in place by screws and which closes the bottoms of the recesses 68, 68. Vertical pivot pins 72 extend through the pins 64, 64 and through the main body of the arm 38 and through the bottom plate 70 thereof. Thus the pins 64, 64 which carry the rollers are free for slight oscillatory movement.

The telephone base 30 is accurately positioned on the platform 10 so that the projections 58, 58 thereof are between the pairs of rollers 60, 60 and 62, 62. The rollers constitute anti-friction means which permit the arm 38 to move freely upward or downward with respect to the base and inasmuch as the said rollers are formed at least in part of rubber or equivalent material, there is no possibility of scratching or marring the said projections on the base. Inasmuch as the rollers can oscillate they can adjust themselves to minor inaccuracies in the location of the base 30 with respect to the post 14.

The telephone base shown in Fig. 1 is that of a standard telephone. Certain other telephones, as for instance those for inter-office use, have the button 34 at a slightly higher elevation. To accommodate such higher elevation of the button 34 an alternative stud 74 may be provided, as shown in Fig. 5, this stud being provided with a flange 76 which is somewhat thicker than the flange 20 shown in Figs. 1, 4, 6 and 7. The flange 76 of greater thickness holds the entire accessory at a slightly higher elevation so as to accommodate the higher elevation of the button 34.

The upper portion of the post 14 has a central cylindrical aperture therein and a vertical rod 78 accurately fits this aperture, being rotatable therein. The lower end of the rod 78 is preferably reduced in diameter, and the lower end of the aperture in the post 14 has a corresponding reduced diameter. There is thus provided a shoulder 79 which constitutes a bearing for supporting the rod when it is in its lowermost position as shown.

A laterally extending arm 88 is provided which is connected at one end with the upper end of the rod 78. The arm 88 is pivotally movable relatively to the rod to positions at vertically different angles. As shown a two-part socket clamp is connected with the upper end of the rod 78, this clamp having left and right parts 80 and 82 formed of sheet metal. The left part 80 of the clamp has an offset 84 to which is secured a nut 86. As clearly shown in Fig. 7, the upper end of the rod 78 is reduced in diameter and is threaded for engagement with the nut 86. The extreme upper end portion of the rod 78 is peened or riveted to hold the rod 78 and the nut 86 in permanent engagement.

The laterally extending arm 88 is shown as having a ball-like enlargement 90 which is clamped between the two parts 80 and 82 of the clamp. The projecting end of the arm 88 carries the holder 26 in a manner to be described. A bolt 92 extends through apertures in the two parts 80 and 82 of the clamp and is engaged by a nut 94. By turning the nut 94 the bolt acts to draw the two parts 80 and 82 of the clamp toward each other so as to clamp between them the ball-like enlargement 90 of the arm 88.

A member is provided which is carried by the the said rod 78 and which has therein a plurality of notches of different depths for receiving the arm 88 and for supporting it in any one of a plurality of positions at vertically different angles. As shown, the said ball-like enlargement 90 of the arm is generally pear-shaped and the right part 82 of the clamp constitutes the said notched member, and is provided with a plurality of notches 96, 96 into which the right end of the ball-like enlargement 90 can fit. As shown, there are three notches which are of different depths. By placing the arm 88 so that the ball-like enlargement 90 is seated in one or another of the notches 96, 96 the arm 88 can be held in three angularly different positions. This makes it possible for the holder 26 and the combined transmitter and receiver 28 to be held not only in different elevations but at different angular positions to suit the convenience of the user.

Under some circumstances it may be desirable to provide for angular positions of the arm 88 additional to those which are provided by the three notches 96, 96. When this is desirable the ball-like enlargement 90 of the arm 88 may be provided with annular grooves 98, 98 and the edges of the clamp part 80 may be provided with lips 100 adapted to be seated in one or another of the grooves 98, 98 by means of the said grooves 98 and the said lips 100, the ball-like enlargement 90 may be gripped and held in positions other than the positions attained by the engagement of the said ball-like enlargement with the bottoms of the notches 96, 96.

The holder 26 is preferably so connected with the arm 88 that it may be rotatably adjusted with respect thereto. As shown there is provided a disc 102 having a hollow hub 104 which is interiorly threaded for engagement with a threaded end portion of the arm 88. A second disc 106 is provided which normally has face to face engagement with the disc 102. The before-mentioned holder includes a sheet metal plate 108 and this plate is connected by means of rivets 110 with a flange 112 formed integrally with the disc 106. The disc 106 is provided with an integral stud 114 which extends through an aperture in the disc 102 and into the hollow hub 104 thereof. A coil compression spring 116 is located within the hub 104 and surrounds the stud 114. A screw 118 has threaded engagement with the stud 114 and the head of the screw serves as an abutment for the spring 116. It will be seen that the spring 116 normally holds the disc 106 in engagement with the disc 102, but permits it to be slightly separated therefrom when desired. After the parts have been assembled as shown in Fig. 12 a pin 120 may be inserted through the hub 104 and through the threaded end of the arm 88 to permanently lock the parts in assembled relationship.

The discs 102 and 106 are provided with means which enables them to interengage with each other so that the disc 106 may be releasably held in a variety of positions of rotative adjustment with respect to the disc 102. As shown in Fig. 13, the disc 102 has an annular series of holes 122, 122 therein and the disc 106 carries a pin 124 adapted to enter any one of the holes 122, 122. It will be seen that the angular position of the holder 26 with respect to the arm 88 can be changed by moving the holder toward the right in opposition to the spring 116, thus withdrawing the pin 124 from the hole 122 in the disc 102. Then the holder can be rotated with respect to the arm 88 and released, the pin 124 entering another hole 122 in the disc 102. Thus the holder is normally held against relative rotation, but can be angularly adjusted as desired.

The holder 26 includes not only the before-mentioned plate 108 but also two clips 126, 126 which are adapted to receive and hold the combined transmitter and receiver 28. Clips 126, 126 may be varied as to details but I prefer to provide clips as shown in detail in Fig. 14. As shown, each clip comprises a generally U-shaped metallic spring 128 secured to the plate 108 by means of a rivet 130. Each clip also includes a generally U-shaped body 132 of yieldable resilient material such as rubber, the body 132 being within the confines of the spring 128. The interior of the U-shaped body 132 is shaped to substantially fit the corresponding portion of the combined transmitter and receiver. When the transmitter and receiver is to be put in place on the holder it is pushed toward the plate 108, the clips spreading sufficiently to permit the said transmitter and receiver to enter the interior opening in the base 132 of rubber or equivalent material. Thus the transmitter and receiver is firmly held in place and is engaged only by the bodies of rubber or equivalent material, thus avoiding any possibility of scratching or marring the said transmitter and receiver.

As has been stated, the arm 88 may be angularly adjusted vertically, thus changing the height of the holder 26 and of the transmitter and receiver 28. However, the adjustment of the arm 88 is depended upon primarily for changing the angle of the transmitter and receiver rather than for changing the elevation thereof. The elevation of the transmitter and receiver may be changed by vertically moving the rod 78 with respect to the post 14. The rod 78 has two or more annular grooves 134, 134 therein and the rod 78 can be raised to locate any one of the said grooves 134, 134 just above the top of the nut 56. With the rod 78 so raised, a stop 136, as shown in detail in Figs. 9 and 10, is engaged with the said rod at the last said groove thereof. As shown, the stop 136 comprises a lower plate 138 having a notch therein, and the notched portion of the said plate 138 is adapted to enter the annular groove in the rod 78, the said plate 138 resting on the nut 56 as shown in Fig. 9. The stop 136 also includes a spring 140 which embraces the rod 78 and is shaped to engage the rod to resiliently hold the stop in place. The stop may also comprise a second plate 142 at the top for covering the spring 140.

Fig. 7 shows the rod 78 in its lowermost position, it being supported on the shoulder at 79. The rod can be raised to position either of the grooves 134, 134 adjacent the top of the nut 56, and the stop 136 can be snapped in place. Fig. 2 shows the rod 78 raised and shows the stop 136 engaged with the rod at the lower groove 34 therein. The rod 78 can be held at any one of three elevations, and the number of positions may be increased by increasing the number of annular grooves 134, 134.

Preferably the rod 78 is provided with an additional annular groove near the top thereof with which the stop 136 can be engaged when the rod is in its lowermost position as shown in Fig. 7. When the stop is in the position shown in Fig. 7 it has no function, but it is retained in place so that it will not be lost.

The usual cord 144, connecting the transmitter and receiver with the base, may be held by a hook 146 carried by the arm 88. Thus the cord is maintained in a convenient elevated position.

From the foregoing description it will be apparent that the transmitter and receiver 28 may be held in any position that is most convenient for the user. It may be adjusted angularly in one direction by changing the position of the arm 88 with respect to the socket clamp and it may be angularly adjusted in another direction by changing the position of the disc 106 with respect to the disc 102. The elevation may be changed by raising the rod 78 and putting the stop 136 in place at one of the grooves 134, 134. The transmitter and receiver can at all times be freely rotated about the axis of the rod 78 and the post 14.

With the transmitter and receiver adjusted to the most convenient position, the user has his hands free at all times for handling papers and for making notes and the like. When the telephone is not in use the lever 56 is in its upper position as shown in Fig. 1. Whenever the telephone is to be used the user merely moves the lever 56 to its lower position as shown in Fig. 2, thus opening the telephone circuit so that the desired number can be dialed in the usual manner. Upon completion of use the lever 56 is restored to the position shown in Fig. 1.

What I claim is:

1. In an accessory for use with a telephone, the combination of a vertical post, means for attaching the post to a horizontal support for the base of a telephone which base has a vertically movable button for opening and closing the telephone circuit, a holder for a combined telephone transmitter and receiver, connections between the upper end of the post and the holder for supporting the latter on the former, a vertically movable sleeve surrounding the post below the said upper end thereof which sleeve carries a horizontally extending arm adapted to engage the movable button on the telephone base, a spring for moving the sleeve and arm downward to thereby move the button to its lower open-circuit position, and a manually movable eccentric carried by the post below the sleeve for engaging the sleeve to move it and the arm upward in opposition to the spring so as to release the button and permit it to move to its upper closed-circuit position.

2. An accessory as set forth in claim 1, wherein the post has a transverse hole below the sleeve, wherein a rotatable shaft is located in the hole, wherein the shaft carries at least one eccentric which engages the bottom of the sleeve, wherein a manually operable lever is connected with the said shaft and eccentric for rotating them, and wherein the post carries a stop pin engageable by the lever for limiting the extent of rotation of the shaft and eccentric.

3. An accessory as set forth in claim 1, wherein the post has a transverse hole below the sleeve, wherein a rotatable shaft is located in the hole, wherein the shaft carries two similar eccentrics which engage the bottom of the sleeve at opposite sides of the [past] *post*, and wherein a manually operable lever is connected with the said shaft and eccentrics for rotating them.

4. An accessory as set forth in claim 1, wherein means is provided for guiding the sleeve for vertical movement and for preventing rotative movement thereof with respect to the post, and wherein the arm is rotatably moved relatively to the sleeve about the vertical axis thereof.

5. In an accessory for use with a telephone, the combination of a vertical post, means for attaching the post to a horizontal support for the base of a telephone which base has a vertically movable button for opening and closing the telephone circuit and which base also has two similar upward projections at opposite sides of the button, a holder for a combined telephone transmitter and receiver, connections between the upper end of the post and the holder for supporting the latter on the former, a vertically movable slide on the post below the said upper end thereof which slide carries a horizontally extending arm adapted to engage the movable button on the telephone base, manually operable means for causing downward and upward movements of the slide and arm to move the button to its lower open-circuit position or to its upper closed-circuit position, and two pairs of rollers on the arm so positioned that the rollers of the two pairs are at opposite sides of the respective upward projections on the telephone base.

6. An accessory [a] *as* set forth in claim 5, wherein there are two horizontal pins connected between their ends to the arm for limited movement about vertical axes, and wherein the rollers are mounted on the said pins.

7. In an accessory for use with a telephone, the combination of a vertical straight post having a central vertical cylindrical hole in the upper portion thereof, means for attaching the post to a horizontal support for the base of a telephone which base has a vertically movable button for opening and closing the telephone circuit, a [vertically movable slide on the] *slide surrounding the straight vertical* post below the said upper end thereof which slide [carries a horizontally extending arm] *engages the said post to be guided for vertical rectilinear movement relatively thereto, an arm rigidly connected with the slide and extending horizontally therefrom and from the post which arm is* adapted to engage the movable button on the telephone base, a manually operable means *mounted on the straight post* for causing downward and upward movements of the slide and arm to move the button to its lower open-circuit position or to its upper closed-circuit position, a *vertical* rod fitting the said hole in the post and rotatable therein which rod extends upward beyond the post, a holder for a combined telephone transmitter and receiver, and connections between the upper end of the rod and holder for supporting the latter on the former.

8. An accessory as set forth in claim 7, wherein the rod is vertically adjustable in the hole in the post, and wherein a stop is connectible with the rod to support it on the post in a position above its lowermost position.

9. An accessory as set forth in claim 7, wherein the rod is provided with a plurality of annular grooves, and wherein a stop is releasably connectible with the rod at any one of the said grooves therein for supporting the rod on the post in any one of a plurality of positions above its lowermost position.

10. In an accessory for use with a telephone, the combination of *a* vertical straight post having a central vertical cylindical hole in the upper portion thereof, means for attaching the post to a horizontal support for the base of a telephone which base has a vertically movable button for opening and closing the telephone circuit, a vertically movable slide on the post below the said upper end thereof which slide carries a horizontally extending arm adapted to engage the movable button on the telephone base, manually operable means for causing downward and upward movements of the slide and arm to move the button to its lower open-circuit position or to its upper closed-circuit position, a rod fitting the said hole in the post and rotatable therein which rod extends upward beyond the post, an arm connected at one end with the upper end of the said rod and pivotally movable relatively to the said rod to positions at vertically different angles, a member carried by the said rod and having therein a plurality of notches of different depths for receiving the *last said* arm and for supporting it in any one of a plurality of positions at vertically different angles, and a holder for a combined telephone transmitter and receiver carried by the opposite end of the last said arm.

11. In an accessory for use with a telephone, the combination of a vertical straight post having a central vertical cylindrical hole in the upper portion thereof, means for attaching the post to a horizontal support for the base of a telephone which base has a vertically movable button for opening and closing the telephone circuit, a vertically movable slide on the post below the said upper end thereof which slide carries a horizontally extending arm adapted to engage the movable button on the telephone base, manually operable means for causing downward and upward movements of the slide and arm to move the button to its lower open-circuit position or to its upper closed-circuit position, a rod fitting the said hole in the post and rotatable therein which rod extends upward beyond the post, a two-part socket clamp carried by the rod at the upper end thereof, one of the parts of the clamp being provided with a plurality of notches therein having different depths, an arm having a ball-like enlargement at one end thereof and located between the parts of the clamp which enlargement is adjustable to permit a portion of the arm to lie within any one of the said notches so that the last said arm is supported at any one of a plurality of angularly different positions, and a holder for a combined telephone transmitter and receiver carried by the opposite end of the last said arm.

12. An accessory as set forth in claim 11, wherein the ball-like enlargement of the second said arm has a plurality of annular grooves therein, and wherein one of the parts of the clamp has lips for entering the said annular grooves to hold the ball-like enlargement and the second said arm in a selected position.

13. In an accessory for use with a telephone, the combination of a vertical straight post having a central vertical cylindrical hole in the upper portion thereof, means for attaching the post to a horizontal support for the base of a telephone which base has a vertically movable button for opening and closing the telephone circuit, a vertically movable slide on the post below the said upper end thereof which slide carries a horizontally extending arm adapted to engage the movable button on the telephone base, manually operable means for causing downward and upward movements of the slide and arm to move the button to its lower open-circuit position or to its upper closed-circuit position, a rod fitting the said hole in the post and rotatable therein which rod extends upward beyond the post, an arm connected with the upper end of the rod and extending laterally therefrom, a holder for a combined telephone transmitter and receiver, and a connection between the holder and the projecting end of the last said arm comprising a member secured to the arm and a mating member secured to the holder and rotatable about the axis of the arm which members have interengaging portions tending when engaged to prevent rotation of the holder relatively to the last said arm and the said connection also comprising a spring normally holding the said members in engagement and yieldable to permit them to be separated sufficiently to enable the holder to be rotatively adjusted with respect to the last said arm.

*14. In an accessory for use with a telephone, the combination of a vertical post, means for attaching the post to a horizontal support for the base of a telephone which base has a vertically movable button for opening and closing the telephone circuit and which base also has two similar upward projections at opposite sides of the button, a holder for a combined telephone transmitter and receiver, connections between the upper end of the post and the holder for supporting the latter on the former, a vertically movable slide on the post below the said upper end thereof which slide carries a horizontally extending arm adapted to engage the movable button on the telephone base, manually operable means for causing downward and upward movements of the slide and arm to move the button to its lower open-circuit position or to its upper closed-circuit position, and two horizontally aligned rollers on the arm positioned respectively for engagement with the said upward projections on the telephone base at the sides thereof adjacent the post.*

*15. An accessory as set forth in claim 14, wherein there is a horizontal pin connected between its ends to the arm for limited movement about a vertical axis, and wherein the rollers are mounted on the said pin.*

References Cited in the file of this patent or the original patent

UNITED STATES PATENTS

| Number | Name | Date |
|---|---|---|
| 564,034 | Snow | July 14, 1896 |
| 1,847,649 | Hazard | Mar. 1, 1932 |
| 2,260,703 | Daly | Oct. 28, 1941 |
| 2,310,032 | Mathieson | Feb. 2, 1943 |
| 2,521,043 | Citso | Sept. 5, 1950 |

FOREIGN PATENTS

| Number | Country | Date |
|---|---|---|
| 221,123 | Switzerland | Sept. 16, 1942 |